Feb. 22, 1949. A. P. STECKEL 2,462,568
WATER KITE
Filed Nov. 4, 1944 2 Sheets-Sheet 1
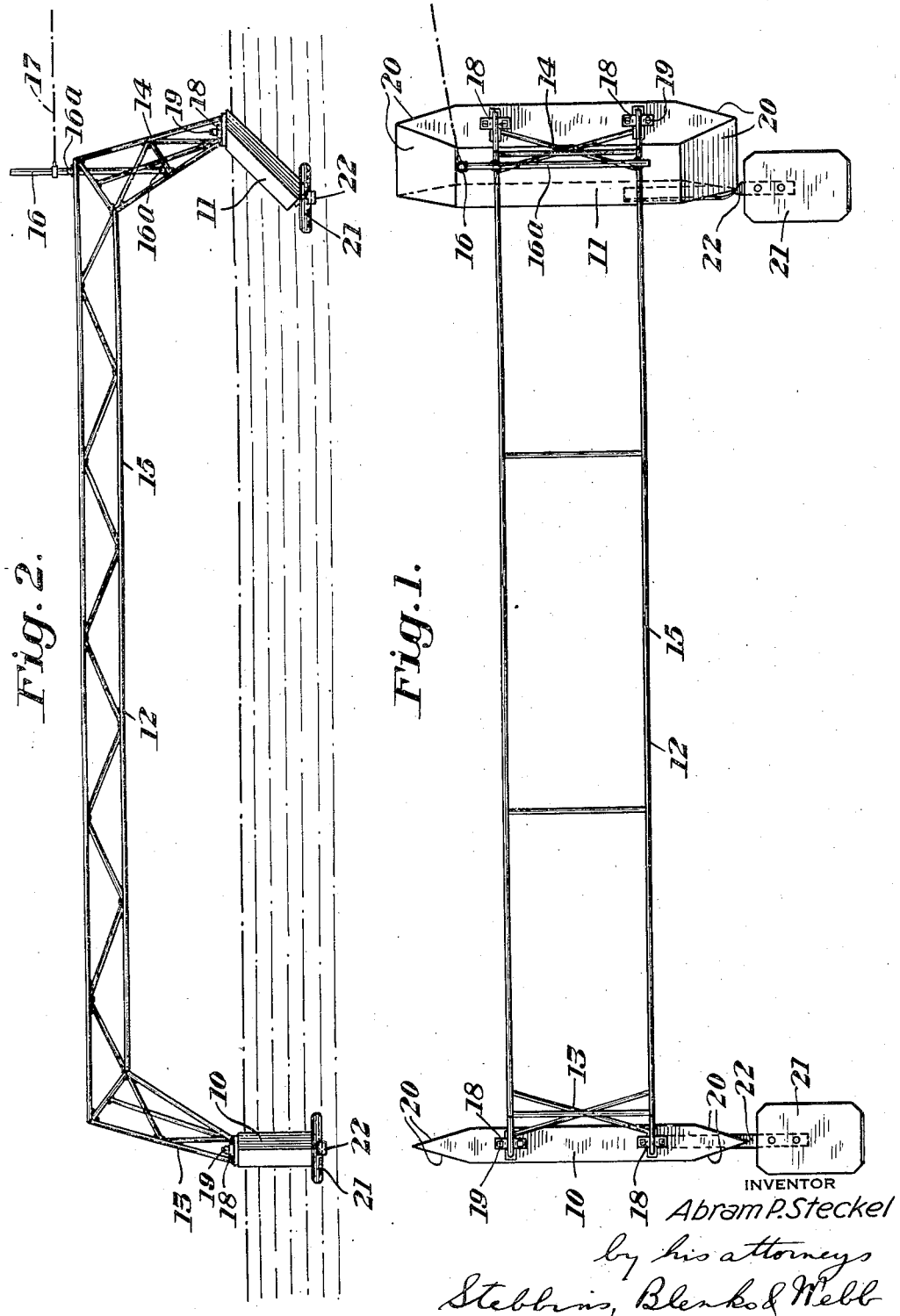
INVENTOR
Abram P. Steckel
by his attorneys
Stebbins, Blenko & Webb Feb. 22, 1949.   A. P. STECKEL   2,462,568
WATER KITE
Filed Nov. 4, 1944   2 Sheets-Sheet 2
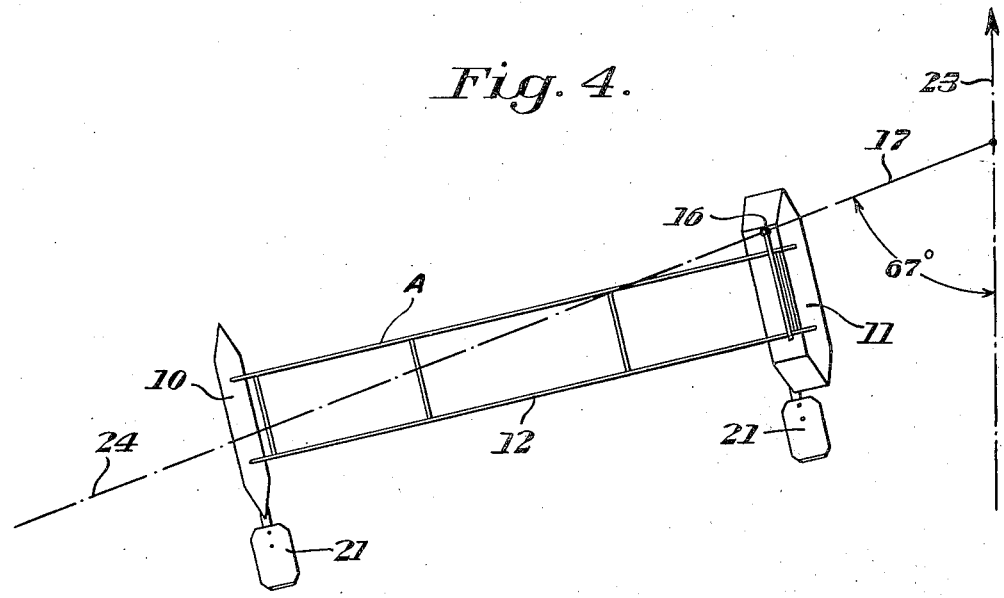
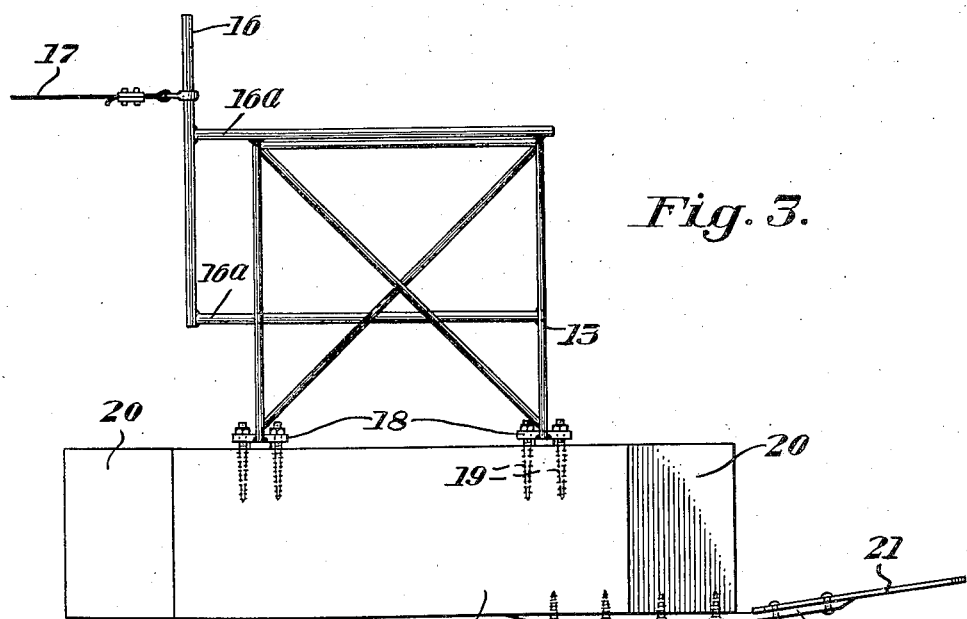
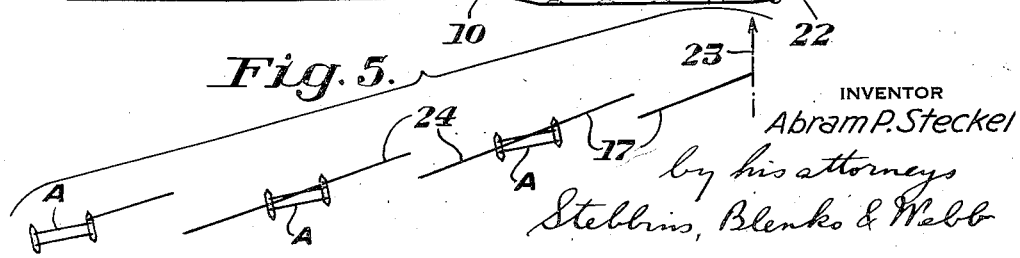
INVENTOR
Abram P. Steckel
by his attorneys
Stebbins, Blenko & Webb Patented Feb. 22, 1949

2,462,568

UNITED STATES PATENT OFFICE 2,462,568

WATER KITE

Abram P. Steckel, Youngstown, Ohio

Application November 4, 1944, Serial No. 561,846

4 Claims. (Cl. 114—235)

This invention relates to a marine appliance and, in particular, to a floating structure adapted to carry a line laterally from a vessel as it advances through the water, so that the line makes an angle but slightly less than 90 degrees with the course of the vessel.

It may be desirable, under certain conditions, to send a line out laterally of a ship moving through the water for various purposes. One example is found in the use of paravanes as a defense against anchored enemy mines. A paravane usually comprises a submerged body towed by a ship in a relatively close-by-position. My invention differs therefrom in that it comprises a floating structure adapted to carry a fine, light line above the level of the water to substantial distances laterally of the towing vessel, i. e., distances of the order of hundreds of yards.

In a preferred embodiment, my invention comprises a pair of elongated buoyant vanes disposed in spaced parallel relation and connected by a bridging frame standing above the level of the water. One of the vanes is arranged to stand vertically in the water while the other is preferably disposed at an oblique angle of approximately 45 degrees. When the device is towed by a line attached adjacent one end and above the water, it tends to stand off abeam of the towing vessel so that the line makes an angle of approximately 65 degrees with the vessel's course. When it is desired to carry a line off laterally to extreme distances, a plurality of devices may be used and secured to the line in spaced relation.

A complete understanding of the invention may be obtained from the following detailed description and explanation which refer to the accompanying drawings illustrating a preferred embodiment. In the drawings, Figure 1 is a plan view of the device;

Figure 2 is an elevation looking at the rear side;

Figure 3 is an end elevation such as would be seen by looking from the left in Figure 2;

Figure 4 is a diagram illustrating the operation of the device; and

Figure 5 is another diagram showing the manner of connecting a plurality of the devices to a single line.

Referring in detail to the drawings, my invention comprises what I term a water kite having a pair of elongated buoyant vanes 10 and 11 disposed in spaced parallel relation and connected by a bridging frame 12. The frame is preferably of truss construction and may conveniently be made of welded tubing. It includes legs 13 and 14 and a horizontal beam portion 15 extending therebetween. A post 16 is secured to the frame adjacent one end for the attachment of a towing line as indicated by the chain line 17. The post is preferably secured to horizontal members 16a projecting forwardly of the frame as shown in Figure 3.

The vanes 10 and 11 have plane lateral surfaces and are secured to the lower ends of the legs 13 and 14 by straps 18. The vanes may be of wood, either hollow or solid, or of sheet metal. If of solid wood, the wood should be selected to give adequate buoyancy. In this case, the straps may be secured by lag screws 19. The vanes are preferably tapered fore and aft as at 20 to reduce head resistance. The vane 10, as shown in the drawings, is so mounted on the frame 12 that it stands vertically in the water while the vane 11 is inclined with its bottom inwardly of its top at an agle of about 45 degrees. The purpose of this arrangement is to provide an upward force component resulting from the reaction of the water when the tow line 17 is tensioned, thus preventing any tendency of the device to dip under at the end to which the line is attached.

Upwardly inclined, horizontal guide planes 21 are mounted on straps 22 secured to the bottoms of the vanes and extending rearwardly therefrom. These planes overcome any tendency of the device to dive or head down at the leading side when being towed.

Figure 4 illustrates the position of the device indicated generally by A relative to the course of the towing vessel indicated by chain line 23. When the device is placed in the water and the line 17 payed out, it takes up a position such as that shown, the exact angle being from 65 to 70 degrees. Since the device is free to pivot about the post 16, it will naturally assume a position such that the opposing moments of the forces caused by the reaction of the water on the vanes are equalized. The exact angular position depends on the speed of the towing vessel. Usually this position is such that the projection of the tow line indicated by chain line 24 passes through the vane 10 aft of the center.

If the line 17 is attached to the towing vessel at a suitable height, the device, is capable of carrying the line out to great distances, i. e., of the order of several hundred yards. As previously indicated, the line should be as small and as light as possible to withstand the tension which must necessarily be exerted to cause the device to advance to a position in which it makes only a small angle with the line normal to the course. The line may conveniently be a steel wire of high tensile strength. Any suitable means may be provided aboard the towing vessel for taking in and paying out the line, such as a power driven reel.

When it is desired to carry out a line to extreme distances, such that the line would sag into the water if only one device were employed, I utilize a plurality connected in spaced relation to the line as indicated in Figure 5. In this figure, because of space limitations, the line is shown broken and the devices are not in their proper relative positions. The distance between adjacent devices should not be so great as to permit the line therebetween to sag into the water. By this arrangement, it is possible to carry out a line to relatively great distances which may be desirable under certain circumstances. The line 17 is so attached to the frame, as shown in Figure 3, as to avoid interference with free swinging of the device for the purpose of self-alinement by the continuation of the line. As shown in Figure 5, the use of a plurality of the devices does not affect the average angle between the towing line and the course of the towing vessel.

It will be apparent that the invention is characterized by numerous advantages. The construction is light and inexpensive yet it is extraordinarily stable under conditions of actual operation. The relatively large span between the vanes, i. e., approximately three times the length of the vanes, together with the tilted position of the vane on the towing side, prevents tilting or turning over sidewise even though the towing line is attached at a substantial height above the water. By attaching the line to the towing vessel at a suitable height, the line may be kept clear of the water, even when the water is relatively rough. The higher the waves to be encountered, the larger the device should be. I thus overcome the disadvantage of submerged paravanes previously known, viz., the relatively short distance at which they are effective because of the increasing resistance on the towing line, tending to decrease the angle thereof relative to the vessel's course when the line is payed out to substantial lengths.

Although I have illustrated and described but a preferred embodiment of the invention, it will be recognized that changes in the design and arrangement of the parts may be made within the scope of the appended claims.

I claim:

1. A water craft comprising spaced substantially parallel buoyant vanes adapted to be largely submerged, and a bridge frame extending upwardly from the vanes and connecting them above the surface of the water, at least one of the vanes having a flat side disposed substantially vertical effective to develop pressure resisting lateral movement of the craft when towed by a line secured adjacent one end of the frame and causing the craft to stand off abeam of the towing means at an angle greater than 45° with the course of the latter.

2. A water craft as defined by claim 1 characterized by generally horizontal tail fins attached to said vanes.

3. A catamaran-like water craft adapted to be towed at one side of another craft, comprising elongated, spaced, substantially parallel buoyant vanes disposed side-by-side adapted to be largely submerged, at least one of which is substantially vertical, said vanes having parallel flat sides, a frame connecting said vanes and rising therefrom clear of the water, and means adjacent one end of the frame and extending thereabove for the attachment of a tow line to permit free pivotal movement of the vehicle, the flat sides of said vertical float resisting lateral movement of the craft and causing it to stand off abeam of said other craft.

4. A water craft for carrying out a tow line suspended entirely in the air to a substantial distance from a towing vessel and as nearly abeam thereof as possible, comprising a pair of parallel spaced buoyant vanes largely submerged and having parallel flat sides and a length several times their width, and a rigid frame secured to said vanes and extending entirely above the water, at least one of said vanes being substantially vertical.

ABRAM P. STECKEL.

REFERENCES CITED

The following references are of record in the file of this patent:

UNITED STATES PATENTS

| Number | Name | Date |
|---|---|---|
| 392,079 | Steen | Oct. 30, 1888 |
| 522,348 | Martini | July 3, 1894 |
| 909,468 | Simpson | Jan. 12, 1909 |
| 1,112,405 | Forlanini | Sept. 29, 1914 |
| 1,249,107 | Johnson | Dec. 4, 1917 |
| 1,395,924 | Magoun | Nov. 1, 1921 |
| 2,274,200 | Hill | Feb. 24, 1942 |

FOREIGN PATENTS

| Number | Country | Date |
|---|---|---|
| 284,675 | Great Britain | Oct. 4, 1928 |